United States Patent
Bradfield (10) Patent No.: US 8,456,046 B2
(45) Date of Patent: Jun. 4, 2013

(54) GRAVITY FED OIL COOLING FOR AN ELECTRIC MACHINE

(75) Inventor: Michael D. Bradfield, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 136 days.

(21) Appl. No.: 12/796,596

(22) Filed: Jun. 8, 2010

(65) Prior Publication Data

US 2011/0298318 A1 Dec. 8, 2011

(51) Int. Cl.
*H02K 9/00* (2006.01)

(52) U.S. Cl.
USPC ................................ 310/58; 310/61; 310/52

(58) Field of Classification Search
USPC .......................................... 310/58, 61, 52, 59
See application file for complete search history.

(56) References Cited

U.S. PATENT DOCUMENTS

| | | | |
|---|---|---|---|
| 2,080,678 A | 5/1937 | Van Horn et al. | |
| 2,264,616 A | 12/1941 | Buckbee | |
| 2,891,391 A * | 6/1959 | Grant et al. | 62/475 |
| 2,947,892 A * | 8/1960 | Inculet et al. | 310/57 |
| 2,951,954 A * | 9/1960 | Willyoung | 310/61 |
| 3,007,064 A * | 10/1961 | Ward | 310/54 |
| 3,110,827 A * | 11/1963 | Baudry | 310/55 |
| 3,188,833 A * | 6/1965 | Robinson | 62/505 |
| 3,435,263 A * | 3/1969 | Willyoung | 310/61 |
| 3,439,202 A * | 4/1969 | Wanke | 310/52 |
| 3,447,002 A | 5/1969 | C. Ronnevig | |
| 3,525,001 A | 8/1970 | Erickson | |
| 3,558,943 A * | 1/1971 | Nilsson | 310/58 |
| 3,643,119 A * | 2/1972 | Lukens | 310/60 R |
| 3,701,911 A * | 10/1972 | Hallerback | 310/60 R |
| 3,748,507 A * | 7/1973 | Sieber | 310/58 |
| 3,800,173 A * | 3/1974 | Rosenberry, Jr. | 310/59 |
| 3,932,778 A * | 1/1976 | Watanabe et al. | 310/61 |
| 4,038,570 A | 7/1977 | Durley, III | |
| 4,301,386 A * | 11/1981 | Schweder et al. | 310/59 |
| 4,365,178 A * | 12/1982 | Lenz | 310/61 |
| 4,547,688 A * | 10/1985 | Hammer et al. | 310/59 |
| 4,745,315 A * | 5/1988 | Terry et al. | 310/68 D |
| 4,845,394 A * | 7/1989 | Kleinhans | 310/64 |
| 5,019,733 A * | 5/1991 | Kano et al. | 310/61 |

(Continued)

FOREIGN PATENT DOCUMENTS

| | | |
|---|---|---|
| JP | 05-103445 A | 4/1993 |
| JP | 05-292704 A | 11/1993 |

(Continued)

OTHER PUBLICATIONS

WIPO Search Report and Written Opinion dated Oct. 29, 2012 for corresponding Application No. PCT/US2012/033915; 8 sheets.

(Continued)

*Primary Examiner* — Tran N. Nguyen
*Assistant Examiner* — Alex W Mok
(74) *Attorney, Agent, or Firm* — Greenberg Traurig LLP (57) ABSTRACT

Embodiments of the invention provide an electric machine module and a method for cooling an electric machine. The electric machine module includes an electric machine and a housing enclosing the electric machine within a machine cavity. The housing can include at least one end cap positioned axially adjacent to the electric machine and including a shroud protruding into the machine cavity. The shroud can include a step with an angled rotor feed path.

15 Claims, 6 Drawing Sheets

U.S. PATENT DOCUMENTS

| | | | |
|---|---|---|---|
| 5,081,382 A * | 1/1992 | Collings et al. | 310/54 |
| 5,180,004 A * | 1/1993 | Nguyen | 165/140 |
| 5,207,121 A * | 5/1993 | Bien | 74/606 R |
| 5,293,089 A | 3/1994 | Frister | |
| 5,319,272 A * | 6/1994 | Raad | 310/68 D |
| 5,372,213 A * | 12/1994 | Hasebe et al. | 180/65.6 |
| 5,519,269 A | 5/1996 | Lindberg | |
| 5,557,153 A * | 9/1996 | Zimmermann | 310/56 |
| 5,616,973 A | 4/1997 | Khazanov | |
| 5,757,094 A * | 5/1998 | van Duyn | 310/58 |
| 5,859,482 A | 1/1999 | Crowell et al. | |
| 5,889,342 A * | 3/1999 | Hasebe et al. | 310/54 |
| 5,923,108 A | 7/1999 | Matake et al. | |
| 5,937,817 A | 8/1999 | Schanz et al. | |
| 5,965,965 A * | 10/1999 | Umeda et al. | 310/52 |
| 6,011,332 A * | 1/2000 | Umeda et al. | 310/58 |
| 6,069,424 A * | 5/2000 | Colello et al. | 310/58 |
| 6,075,304 A | 6/2000 | Nakatsuka | |
| 6,087,746 A | 7/2000 | Couvert | |
| 6,095,754 A | 8/2000 | Ono | |
| 6,097,130 A * | 8/2000 | Umeda et al. | 310/263 |
| 6,114,784 A | 9/2000 | Nakano | |
| 6,147,430 A * | 11/2000 | Kusase et al. | 310/215 |
| 6,147,432 A * | 11/2000 | Kusase et al. | 310/260 |
| 6,173,758 B1 * | 1/2001 | Ward et al. | 165/80.3 |
| 6,181,043 B1 * | 1/2001 | Kusase et al. | 310/201 |
| 6,201,321 B1 | 3/2001 | Mosciatti | |
| 6,208,060 B1 * | 3/2001 | Kusase et al. | 310/216.069 |
| 6,232,687 B1 * | 5/2001 | Hollenbeck et al. | 310/88 |
| 6,242,836 B1 * | 6/2001 | Ishida et al. | 310/215 |
| 6,291,918 B1 * | 9/2001 | Umeda et al. | 310/215 |
| 6,300,693 B1 | 10/2001 | Poag et al. | |
| 6,313,559 B1 * | 11/2001 | Kusase et al. | 310/216.001 |
| 6,333,573 B1 * | 12/2001 | Nakamura | 310/45 |
| 6,335,583 B1 * | 1/2002 | Kusase et al. | 310/216.004 |
| 6,340,853 B1 * | 1/2002 | Kaiho et al. | 310/61 |
| 6,346,758 B1 * | 2/2002 | Nakamura | 310/216.004 |
| 6,359,232 B1 | 3/2002 | Markovitz et al. | |
| 6,404,628 B1 * | 6/2002 | Nagashima et al. | 361/690 |
| 6,417,592 B2 * | 7/2002 | Nakamura et al. | 310/184 |
| 6,459,177 B1 * | 10/2002 | Nakamura et al. | 310/216.136 |
| 6,509,665 B1 | 1/2003 | Nishiyama et al. | |
| 6,515,392 B2 * | 2/2003 | Ooiwa | 310/179 |
| 6,522,043 B2 * | 2/2003 | Masegi | 310/180 |
| 6,559,572 B2 * | 5/2003 | Nakamura | 310/216.072 |
| 6,579,202 B2 * | 6/2003 | El-Antably et al. | 475/159 |
| 6,770,999 B2 * | 8/2004 | Sakurai | 310/208 |
| 6,779,799 B2 * | 8/2004 | Tong et al. | 277/411 |
| 6,897,594 B2 * | 5/2005 | Ichikawa et al. | 310/201 |
| 6,903,471 B2 | 6/2005 | Arimitsu et al. | |
| 6,998,749 B2 * | 2/2006 | Wada et al. | 310/184 |
| 7,002,267 B2 * | 2/2006 | Raszkowski et al. | 310/54 |
| 7,026,733 B2 | 4/2006 | Bitsche et al. | |
| 7,071,586 B2 * | 7/2006 | Hattori et al. | 310/58 |
| 7,173,358 B2 * | 2/2007 | Drubel | 310/201 |
| 7,239,055 B2 * | 7/2007 | Burgman et al. | 310/52 |
| 7,276,006 B2 * | 10/2007 | Reed et al. | 475/5 |
| 7,284,313 B2 * | 10/2007 | Raszkowski et al. | 29/596 |
| 7,294,943 B2 * | 11/2007 | Hattori et al. | 310/58 |
| 7,339,300 B2 * | 3/2008 | Burgman et al. | 310/112 |
| 7,352,091 B2 * | 4/2008 | Bradfield | 310/68 D |
| 7,402,923 B2 | 7/2008 | Klemen et al. | |
| 7,417,344 B2 * | 8/2008 | Bradfield | 310/90 |
| 7,462,962 B2 * | 12/2008 | De Bock et al. | 310/58 |
| 7,508,100 B2 * | 3/2009 | Foster | 310/54 |
| 7,538,457 B2 * | 5/2009 | Holmes et al. | 310/54 |
| 7,545,060 B2 * | 6/2009 | Ward | 310/54 |
| 7,592,045 B2 | 9/2009 | Smith et al. | |
| 7,615,903 B2 * | 11/2009 | Holmes et al. | 310/90 |
| 7,615,951 B2 * | 11/2009 | Son et al. | 318/432 |
| 7,667,359 B2 * | 2/2010 | Lee et al. | 310/86 |
| 7,812,501 B2 * | 10/2010 | Taniyama et al. | 310/270 |
| 7,816,824 B2 * | 10/2010 | Jockel | 310/57 |
| 7,939,975 B2 | 5/2011 | Saga et al. | |
| 8,067,865 B2 | 11/2011 | Savant | |
| 8,068,327 B2 | 11/2011 | Seifert et al. | |
| 2001/0054852 A1 * | 12/2001 | Nakamura | 310/58 |
| 2002/0130566 A1 * | 9/2002 | Greubel et al. | 310/58 |
| 2002/0149273 A1 * | 10/2002 | Soitu et al. | 310/58 |
| 2003/0011253 A1 * | 1/2003 | Kalsi et al. | 310/58 |
| 2003/0038549 A1 * | 2/2003 | Pyrhonen | 310/58 |
| 2003/0048030 A1 * | 3/2003 | Griffith et al. | 310/254 |
| 2003/0222519 A1 | 12/2003 | Bostwick | |
| 2004/0032172 A1 * | 2/2004 | Tong | 310/58 |
| 2004/0036367 A1 * | 2/2004 | Denton et al. | 310/61 |
| 2004/0066099 A1 * | 4/2004 | Weeber et al. | 310/58 |
| 2004/0189110 A1 | 9/2004 | Ide | |
| 2004/0195929 A1 | 10/2004 | Oshidari | |
| 2005/0023266 A1 | 2/2005 | Ueno et al. | |
| 2005/0023909 A1 | 2/2005 | Cromas | |
| 2005/0151430 A1 * | 7/2005 | Lowther | 310/58 |
| 2005/0194551 A1 | 9/2005 | Klaussner et al. | |
| 2005/0206251 A1 * | 9/2005 | Foster | 310/59 |
| 2005/0274450 A1 | 12/2005 | Smith et al. | |
| 2005/0285456 A1 | 12/2005 | Amagi et al. | |
| 2006/0024178 A1 * | 2/2006 | Chen et al. | 417/407 |
| 2006/0055255 A1 * | 3/2006 | Hattori et al. | 310/58 |
| 2007/0024130 A1 | 2/2007 | Schmidt | |
| 2007/0052313 A1 | 3/2007 | Takahashi | |
| 2007/0063607 A1 | 3/2007 | Hattori | |
| 2007/0096588 A1 * | 5/2007 | Kirchner | 310/261 |
| 2007/0096590 A1 * | 5/2007 | Salamah et al. | 310/270 |
| 2007/0126296 A1 * | 6/2007 | Lee et al. | 310/86 |
| 2007/0145836 A1 | 6/2007 | Bostwick | |
| 2007/0149073 A1 | 6/2007 | Klaussner et al. | |
| 2007/0216236 A1 | 9/2007 | Ward | |
| 2007/0236094 A1 * | 10/2007 | Kaminski et al. | 310/156.28 |
| 2007/0252473 A1 * | 11/2007 | Taniyama et al. | 310/270 |
| 2008/0143200 A1 * | 6/2008 | Kalsi et al. | 310/58 |
| 2008/0223557 A1 | 9/2008 | Fulton et al. | |
| 2008/0252169 A1 * | 10/2008 | Fujita et al. | 310/213 |
| 2009/0033160 A1 * | 2/2009 | Mueller | 310/58 |
| 2009/0033161 A1 * | 2/2009 | Bradfield | 310/62 |
| 2009/0108714 A1 * | 4/2009 | Fakes | 310/60 A |
| 2009/0121562 A1 | 5/2009 | Yim | |
| 2009/0174278 A1 | 7/2009 | Sheaffer et al. | |
| 2009/0206687 A1 | 8/2009 | Woody et al. | |
| 2010/0026111 A1 | 2/2010 | Monzel | |
| 2010/0102649 A1 | 4/2010 | Cherney et al. | |
| 2010/0109454 A1 | 5/2010 | Vadillo et al. | |
| 2010/0176668 A1 | 7/2010 | Murakami | |
| 2011/0050141 A1 | 3/2011 | Yeh et al. | |
| 2011/0101700 A1 | 5/2011 | Stiesdal | |
| 2011/0109095 A1 | 5/2011 | Stiesdal | |

FOREIGN PATENT DOCUMENTS

| | | |
|---|---|---|
| JP | 06-036364 U | 5/1994 |
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003009467 A * | 1/2003 |
| JP | 2003169448 A * | 6/2003 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2006-060914 A | 3/2006 |
| JP | 2000-152561 A | 9/2006 |

| | | | |
|---|---|---|---|
| JP | 2006-297541 A | 11/2006 | |
| JP | 2006-528879 A | 12/2006 | |
| JP | 2007-282341 A | 10/2007 | |
| JP | 2008-206213 A | 9/2008 | |
| JP | 2008-219960 A | 9/2008 | |
| JP | 4187606 B2 | 11/2008 | |
| JP | 2008-544733 A | 12/2008 | |
| JP | 2009-247084 A | 10/2009 | |
| JP | 2009-247085 A | 10/2009 | |
| JP | 2009-254205 A | 10/2009 | |
| JP | 2010-028908 A | 2/2010 | |
| JP | 2010-028958 A | 2/2010 | |
| JP | 2010-035265 A | 2/2010 | |
| JP | 2010-063253 A | 3/2010 | |
| JP | 2010-121701 A | 6/2010 | |
| KR | 10-1997-0055103 A | 7/1997 | |
| KR | 10-2000-0013908 A | 3/2000 | |
| KR | 10-2006-0102496 A | 9/2006 | |
| KR | 10-2007-0027809 A | 3/2007 | |
| KR | 10-2009-0048028 A | 5/2009 | |

OTHER PUBLICATIONS

WIPO Search Report and Written Opinion dated Nov. 14, 2012 for corresponding Application No. PCT/US2012/040794; 8 sheets.
International Search Report, Received Jul. 31, 2012.
International Search Report, Received Jan. 9, 2012.
International Search Report, Received Feb. 16, 2012.
International Search Report, Received Dec. 22, 2011.
International Search Report, Received Dec. 5, 2011.
International Search Report, Received Dec. 27, 2011.
International Search Report completed Apr. 19, 2012.
International Search Report completed Apr. 9, 2012.
International Search Report completed Apr. 20, 2012.
International Search Report completed Mar. 8, 2012.
International Search Report completed Apr. 24, 2012.

* cited by examiner

GRAVITY FED OIL COOLING FOR AN ELECTRIC MACHINE

BACKGROUND

Hybrid vehicles offer an opportunity for vehicle drivers to engage in environmentally-conscious behavior because of hybrids' improved fuel economy and reduced emissions. Hybrid vehicles combine traditional internal combustion engines with an electro-mechanical transmission. Electric motors located within the electro-mechanical transmission provide energy to propel the vehicle, reducing the need for energy provided by the internal combustion engine, thereby increasing fuel economy and reducing emissions.

As with any electric machine, the hybrid transmission's electric machine rejects some energy in the form of heat. Efficient removal of heat from the electric machine can improve the lifespan of the electric machine as well as improve the electric machine's operating efficiency.

SUMMARY

Some embodiments of the invention provide an electric machine module including an electric machine and a housing enclosing the electric machine within a machine cavity. The housing can include at least one end cap positioned axially adjacent to the electric machine including a shroud protruding into the machine cavity. In some embodiments, the shroud can include a step with one of a constant-angled and a variable-angled rotor feed path.

Some embodiments of the invention provide an electric machine module including an electric machine including a stator with stator end turns. The electric machine module can also include a housing enclosing the electric machine within a machine cavity. The housing can include a sleeve member substantially circumscribing the electric machine coupled to at least one end cap positioned axially adjacent to the electric machine. In some embodiments, the at least one end cap can include a shroud protruding into the machine cavity. In some embodiments, the shroud, the sleeve member, and the at least one end cap can be positioned to define a stator cavity substantially surrounding the stator end turns in order to help concentrate a coolant within the stator cavity near the stator end turns.

Some embodiments of the invention provide method for cooling an electric machine. The method can include providing the electric machine including a rotor and a stator circumscribing the rotor, where the stator includes stator end turns. The method can also include enclosing the electric machine within a machine cavity of a housing. The housing can include a sleeve member and at least one end cap with a shroud protruding into the machine cavity. The method can further include dispersing a coolant through a plurality of coolant apertures of the sleeve member toward the stator end turns, concentrating at least a first portion of the coolant near the stator end turns using at least the shroud, and providing a step in the shroud to redirect at least a second portion of the coolant toward the rotor.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1:
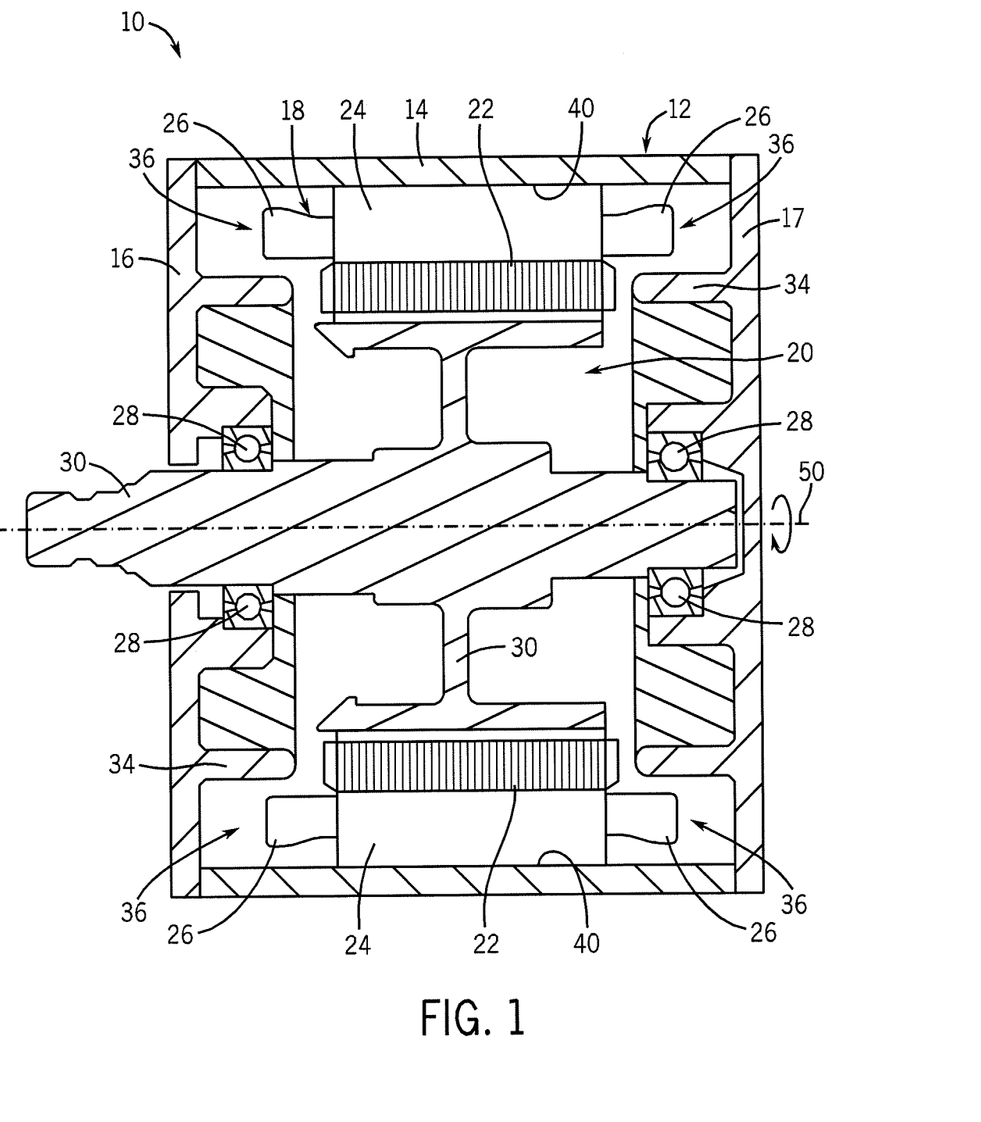
FIG. 1 is a cross-sectional view of an electric motor module according to one embodiment of the invention.

FIG. 1 illustrates an electric machine module 10 according to one embodiment of the invention. The electric machine module 10 can include a housing 12 comprising a sleeve member 14, a first end cap 16, and a second end cap 17. An electric machine 18 can be housed within a machine cavity 20 at least partially defined by the sleeve member 14 and the end caps 16, 17. For example, the sleeve member 14 and the end caps 16, 17 can be coupled via fasteners (not shown), or another suitable coupling manner, to enclose at least a portion of the electric machine 18 within the machine cavity 20. In some embodiments, the end caps 16, 17 can be identical parts. In other embodiments, the end caps 16, 17 can include different individual features.

The electric machine 18 can include a rotor 22, a stator 24, stator end turns 26, and bearings 28, and can be disposed about a main output shaft 30. As shown in FIG. 1, the stator 24 can circumscribe the rotor 22. In some embodiments, the electric machine 18 can also include a rotor hub 32 or can have a "hub-less" design (not shown). The electric machine 18 can be, without limitation, an electric motor, such as a hybrid electric motor, an electric generator, or a vehicle alternator. In one embodiment, the electric machine 18 can be a High Voltage Hairpin (HVH) electric motor for use in a hybrid vehicle.

Components of the electric machine 18 such as, but not limited to, the stator end turns 26, the rotor 22, and the rotor hub 32 can generate heat during operation of the electric machine 18. These components can be cooled to enhance the performance of and increase the lifespan of the electric machine 18.

Figure 2:
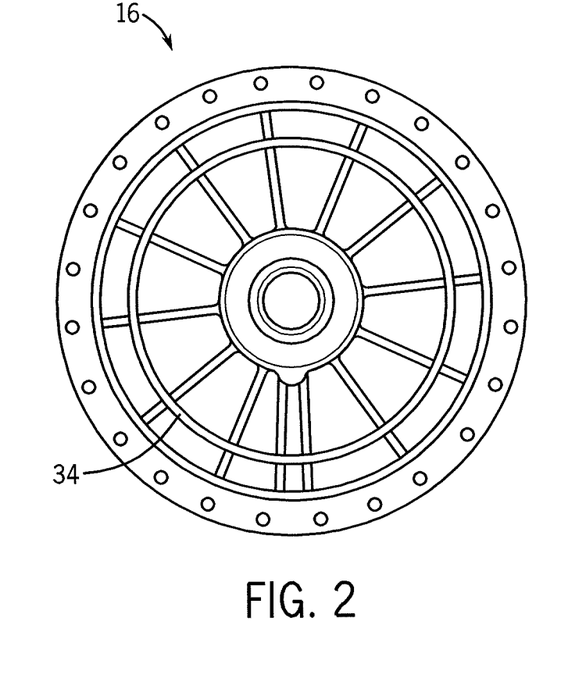
FIG. 2 is a side view of an end cap, according to one embodiment, for use with the electric motor module of FIG. 1.
Figure 3:
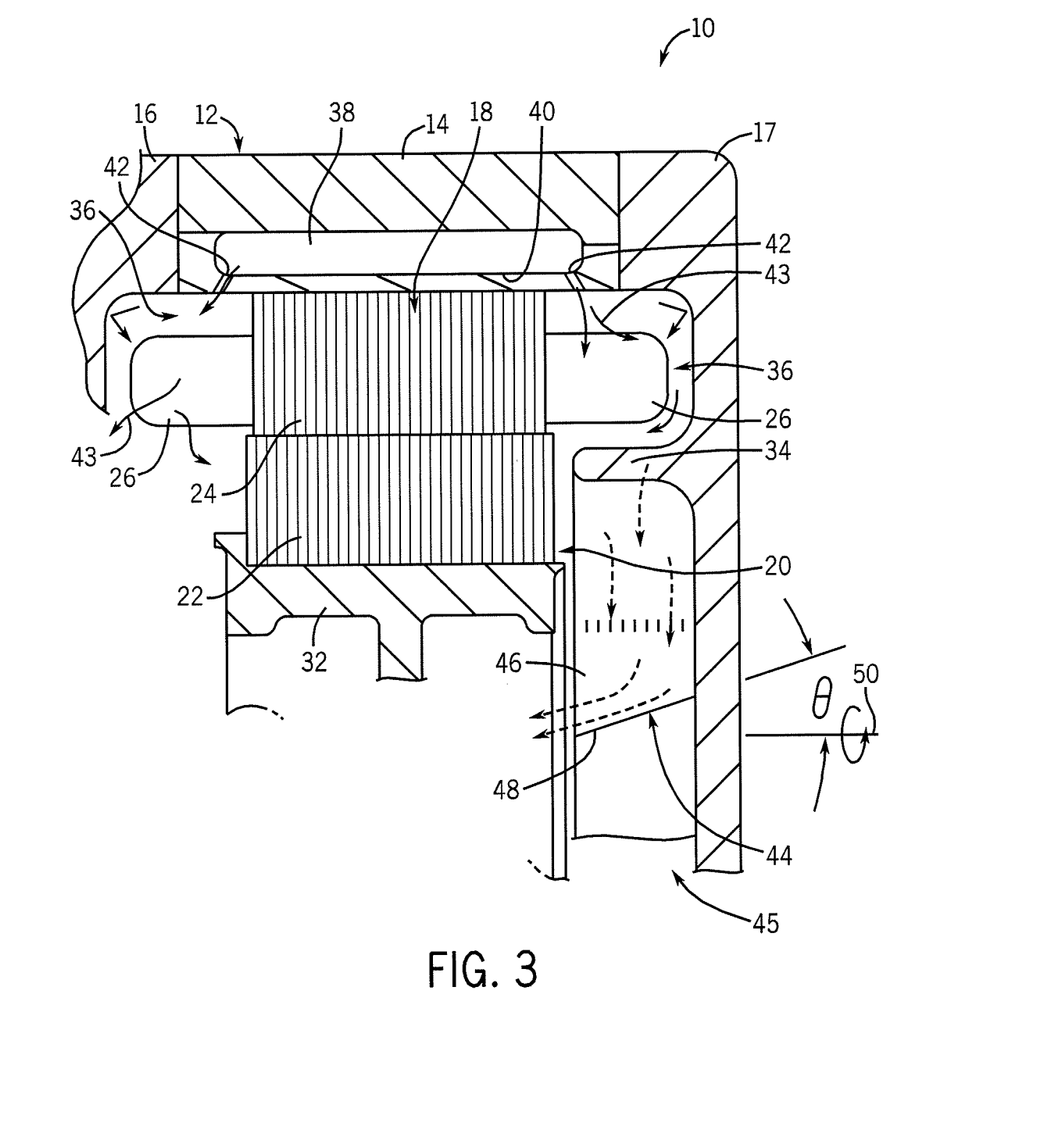
FIG. 3 is a partial cross-section view of an electric motor module according to another embodiment of the invention.
Figure 5:
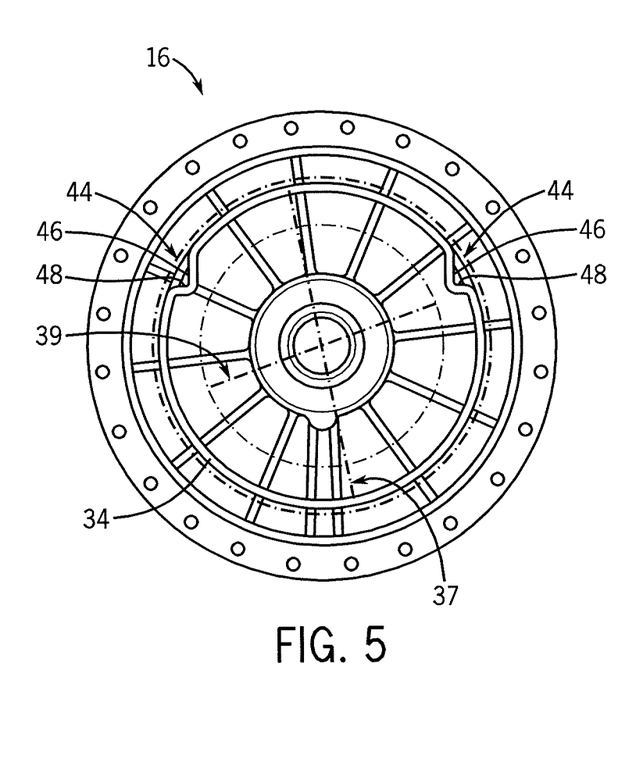
FIG. 5 is a side view of an end cap, according to another embodiment of the invention, for use with the electric motor module of FIG. 3.

The end caps 16, 17 can be fabricated from cast aluminum, steel, stainless steel or similar materials. In some embodiments, one or both of the end caps 16, 17 can include a shroud 34. In some embodiments, the shroud 34 can be a generally ring-shaped extension, as shown in FIG. 2, protruding axially inward into the machine cavity 20, as shown in FIGS. 1 and 3. In some embodiments, the shroud 34 can extend the same axial distance inward along its radial circumference. In other embodiments, some radial portions of the shroud 34 can extend more or less inward than other radial portions of the shroud 34 (not shown). In some embodiments, the shroud 34 can be cast as an integral part of the end cap 16 (and/or 17), or can be an additional piece bolted, welded or coupled to the end cap 16 in another suitable manner. As shown in FIGS. 1 and 3, the shroud 34 can protrude axially inward near a radially inner surface of the stator end turns 26. As a result, the sleeve member 14, the end cap 16 (and/or 17) and the shroud 34 can be positioned to form a stator cavity 36 substantially surrounding each stator end turn 26. In one embodiment, a diameter of the shroud 34 can be substantially equal to an outer diameter 37 of the rotor 22 (as shown in FIG. 5). In another embodiment, the diameter of the shroud 34 can be greater than an inner diameter 39 of the rotor 22 (as shown in FIG. 5).

As shown in FIG. 3, the sleeve member 14 can include an inner coolant jacket 38 substantially circumscribing the stator 24. A coolant, such as water, ethylene glycol, a mixture of water and ethylene glycol, motor oil, hydraulic fluid oil, or a similar fluid, can be cycled through the coolant jacket 38 from a fluid source (not shown) to help remove heat from the electric machine 18. The coolant can be pressurized when it enters the coolant jacket 38 from the fluid source. In addition, an inner wall 40 of the sleeve member 14 can include coolant apertures 42 in fluid communication with both the coolant jacket 38 and the stator cavity 36. The coolant apertures 42 can allow the coolant inside the coolant jacket 38 to be dispersed into the stator cavity 38 toward the stator end turns 26.

The coolant can be dispersed over the stator end turns 26 to help remove heat energy from the stator end turns 26 and help cool the electric machine 18. As the coolant is dispersed into the stator cavity 36, some of the coolant can reach the end caps 16, 17 and/or the shroud 34 (e.g., some of the coolant directly from the coolant apertures 42 and/or some of the coolant which has splashed off the stator end turns 26) and can be redirected back toward the stator end turns 26 to further aid in cooling the electric machine 18. In addition, the shroud 34 can help concentrate the coolant within the stator cavity 36 near the stator end turns 26, which can also aid in further cooling the electric machine 18.

Some portion of the coolant may not deflect back onto the stator end turns 26 from the end caps 16, 17 and/or the shroud 34, but rather adhere to a surface of the end caps 16, 17 and/or the shroud 34. In addition, the stator cavity 36 can be in fluid communication with the motor cavity 20, and thus, a portion of the coolant may not deflect back onto the stator end turns 26, but rather flow into the machine cavity 20.

In an upper portion of the electric machine 12, some of the coolant along the end caps 16, 17 can flow toward the shroud 34 (e.g., due to gravity). A portion of the coolant that reaches the shroud 34 (e.g., from the end caps 16, 17, the coolant apertures 42, and/or the stator end turns 26) can continue to flow downward due to gravity, following a substantially arcuate path created by a surface of the generally ring-shaped shroud 34, as shown in FIG. 4 by arrows 43.

Figure 4:
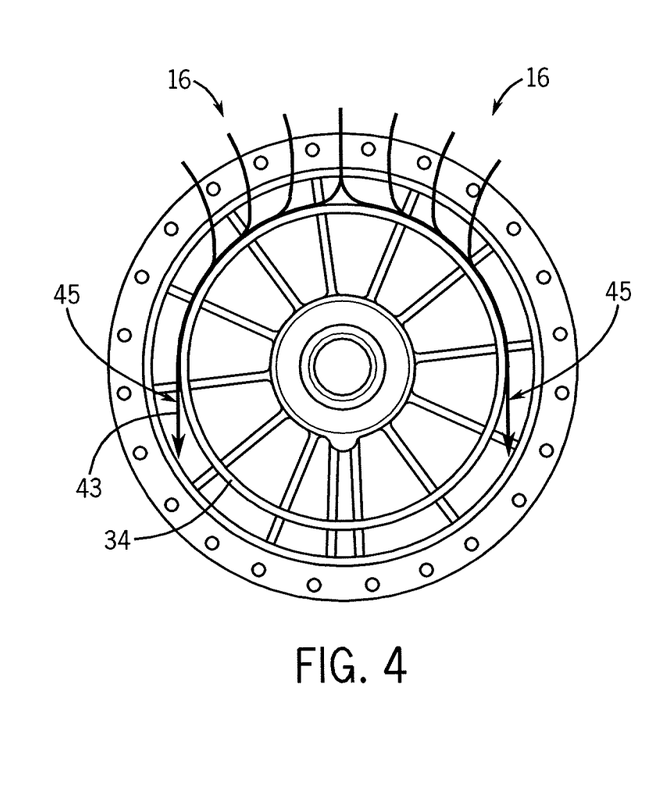
FIG. 4 is a side view of the end cap of FIG. 2 illustrating coolant flow patterns.

As shown in FIG. 4, the coolant can flow along the substantially arcuate path until it reaches a "drop-off" region 45. The drop-off region 45 can be a region, for example near a radially central portion of the electric machine 18, where gravitational forces overcome the adhesive forces of the coolant to the surface of the shroud 34. From the drop-off region 45, the coolant can flow substantially straight down, away from the shroud 34, and pool at or near a lower region of the electric machine 18. The pooled coolant can flow through a drain (not shown) back to the fluid source where it can be cooled and sent back to the coolant jacket 38.

FIG. 5 illustrates a first end cap 16 according to another embodiment of the invention. As shown in FIG. 5, the shroud 34 can include a step 44 at a point along the arcuate path of coolant flow generally before the drop-off region 45. The step 44 can include a first surface 46, which can be a generally radially-inward protrusion of the generally ring-shaped shroud 34, and a second surface, or a rotor feed path 48, which can be a radially outward protrusion from the first surface 46.

Figure 6:
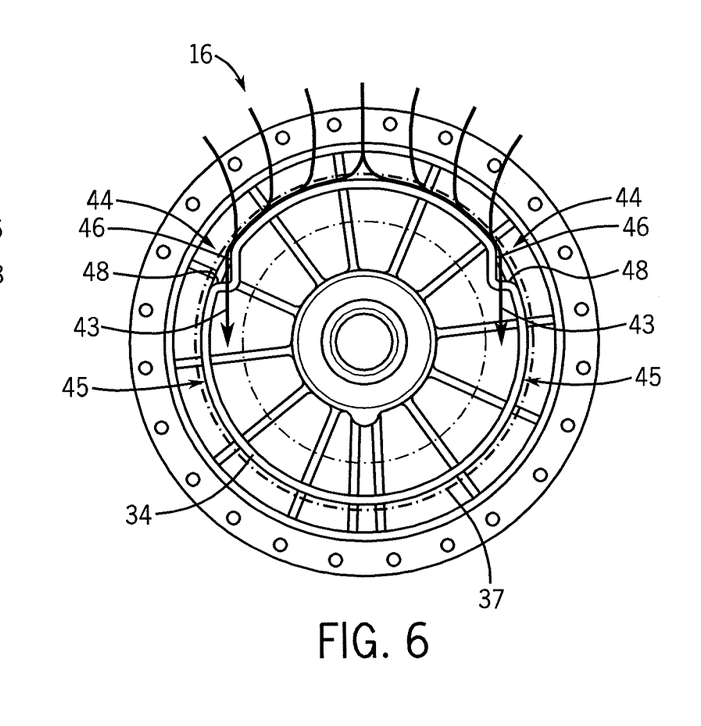
FIG. 6 is a side view of the end cap of FIG. 5 illustrating coolant flow patterns.
Figure 7:
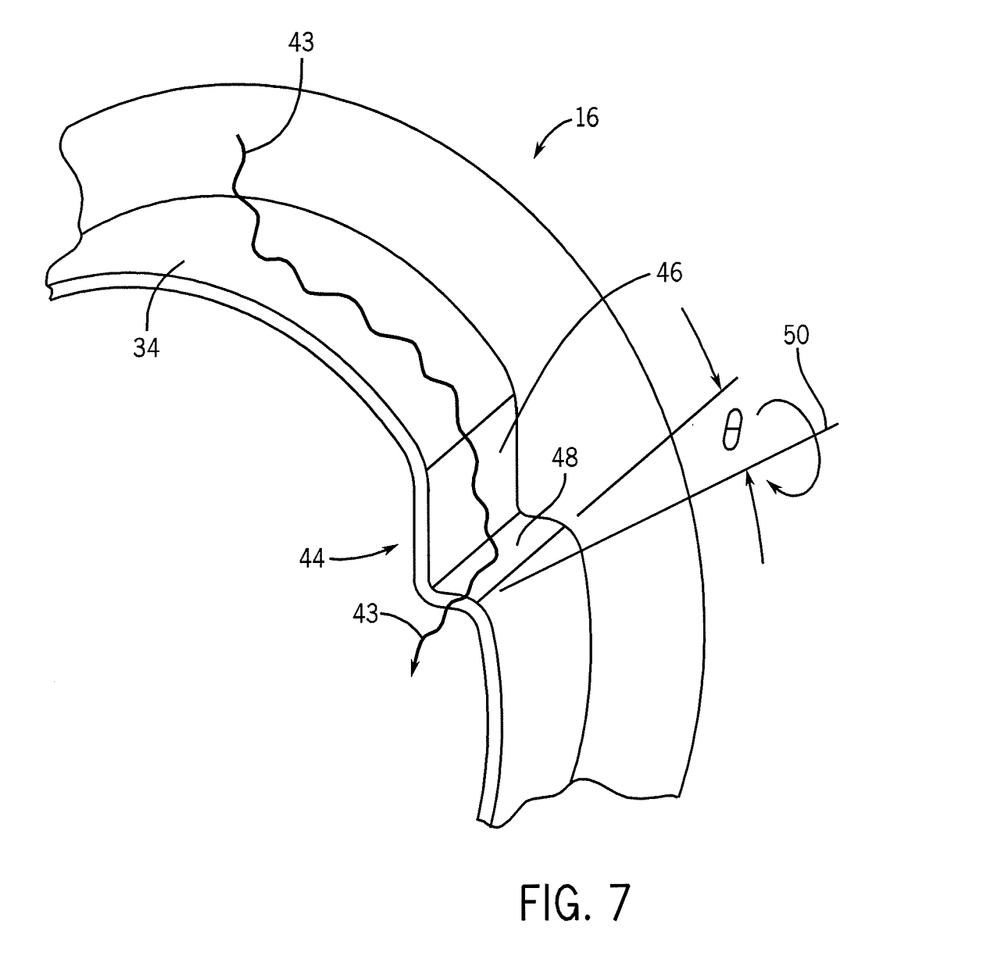
FIG. 7 is a partial perspective view of the end cap of FIG. 5.

The addition of the step 44 in the shroud 34 can eliminate the need for additional passageways in the end caps 16, 17 or the main output shaft 30 which feed the coolant into the machine cavity 20 near the rotor 22 and the rotor hub 32. As shown in FIG. 6, the coolant can flow down the first surface 46 and reach the rotor feed path 48 prior to reaching the drop-off region 45 and flowing off the shroud 34. In addition, as shown in FIGS. 3 and 7, as the rotor feed path 48 extends axially inward from the end cap 16, 17, it can also be angled toward the main output shaft 30. For example, the rotor feed path 48 can be inclined by an angle "θ" relative to a rotation axis 50 of the electric machine 18. In some embodiments, the angle θ can be between about thirty degrees and about sixty degrees.

Figure 8:
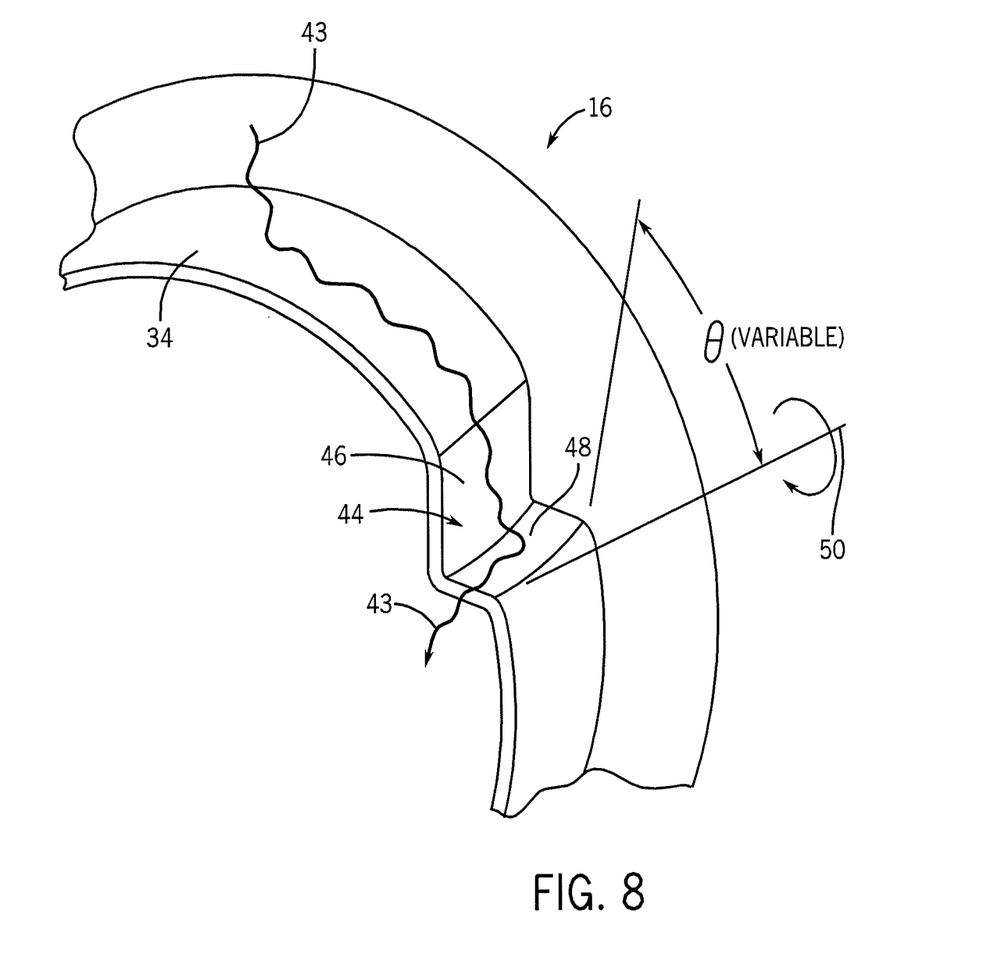
FIG. 8 is a partial perspective view of an end cap according to another embodiment of the invention.

In some embodiments, the angle θ can be constant across the axial length of the rotor feed path 48. More specifically, the rotor feed path 48 can include a substantially straight surface along the inward incline, as shown in FIGS. 3 and 7. In other embodiments, the angle θ can be variable (e.g., ranging between about thirty degrees and about sixty degrees) across the axial length of the rotor feed path 48. More specifically, the rotor feed path 48 can include a substantially curved or stepped surface. For example, as shown in FIG. 8, the angle θ can decrease as the rotor feed path 48 extends axially inward from the end cap 16, 17 to create a substantially curved surface.

The orientation of the rotor feed path 48 can serve as a funnel-type element to change a direction of the coolant. As a result, rather than following the arcuate path along the shroud 34 to the drop-off region 45, the rotor feed path 48 can redirect the coolant flow into the machine cavity 20 toward the rotor 22 and/or the rotor hub 32. More specifically, due to gravity, the coolant can flow down the angled rotor feed path 48 toward the rotor 22 and/or the rotor hub 32. In addition, in some embodiments, the substantially curved surface of the rotor feed path 48 can cause the coolant to flow toward the rotor 22 and/or the rotor hub 32 at an increased axial velocity (compared to a straight inclined surface), which can help prevent the coolant from reaching an air gap formed between the stationary stator 24 and the rotating rotor 22. The coolant, either reaching or in proximity to the rotor 22 and/or the rotor hub 32, can help remove heat from the rotor 22 and the rotor hub 32 to further aid in cooling the electric machine 18.

After flowing throughout the motor cavity 20, the coolant can pool at or near the lower region of the electric machine 18. The pooled coolant can flow through the drain back to the fluid source where it can be cooled and recycled back to the coolant jacket 38. For example, a heat transfer element (e.g., a radiator, a heat exchanger, or a similar element) can be positioned outside the machine cavity 20 to cool the flowing coolant prior to it being recycled back to the coolant jacket 38.

In some embodiments, the housing 12 can comprise a substantially cylindrical canister substantially enclosing the electric machine and a single end cap (not shown). In such embodiments, an axial wall of the canister and the single end cap can each include the shroud 34. Also, a radial wall of the canister can include the coolant jacket 38 and the coolant apertures 42. In other embodiments, the coolant jacket 38 and the coolant apertures 42 can be separate and substantially enclosed by the housing 12.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
an electric machine including a rotor;
a housing enclosing the electric machine within a machine cavity and including at least one end cap positioned axially adjacent to the electric machine; wherein the housing includes a sleeve member generally circumscribing the electric machine and coupled to the at least one end cap; and wherein the sleeve member includes a coolant jacket configured and arranged to contain liquid coolant; and
wherein the sleeve member further comprises coolant apertures wherein an exit of the coolant apertures is configured and arranged to direct the liquid coolant substantially toward a rotational axis of the rotor; and
wherein the coolant apertures are in fluid communication with the coolant jacket configured and arranged to disperse a portion of the liquid coolant substantially unpressurized and under gravity flow from the coolant jacket substantially towards the machine cavity;
the at least one end cap including a shroud protruding into the machine cavity; and
the shroud including a step with one of a constant-angled and a variable-angled rotor feed path, the step being configured and arranged to guide a portion of the liquid coolant toward the rotor substantially unpressurized and under gravity flow to at least partially wet the rotor with the liquid coolant.

2. The electric machine module of claim 1, wherein the constant-angled rotor feed path is a substantially straight surface at an angle between about 30 degrees and about 60 degrees relative to a rotation axis of the electric machine.

3. The electric machine module of claim 1, wherein the variable-angled rotor feed path is a substantially curved surface at varying angles between about 30 degrees and about 60 degrees relative to a rotation axis of the electric machine.

4. The electric machine module of claim 1, wherein the electric machine includes a stator with stator end turns, and the shroud is positioned radially inward from the stator end turns.

5. The electric machine module of claim 1, wherein the shroud is generally ring-shaped.

6. The electric machine module of claim 1, wherein the shroud is capable of receiving the liquid coolant and providing a generally arcuate path for the liquid coolant to flow, wherein the step is capable of receiving the liquid coolant following the generally arcuate path and the rotor feed path causes the liquid coolant to change direction from the generally arcuate path.

7. The electric machine module of claim 1, wherein the coolant apertures are positioned to disperse the liquid coolant toward stator end turns of the electric machine.

8. The electric machine module of claim 1, wherein the sleeve member, the at least one end cap, and the shroud create a stator cavity at least partially surrounding stator ends turns of the electric machine.

9. The electric machine module of claim 1, wherein the housing includes a canister coupled to the at least one end cap.

10. An electric machine module comprising:
an electric machine including a stator with stator end turns;
a housing enclosing the electric machine within a machine cavity and including a sleeve member substantially circumscribing the electric machine coupled to at least one end cap positioned axially adjacent to the electric machine;
the at least one end cap including a shroud protruding into the machine cavity, the shroud, the sleeve member, and the at least one end cap positioned to define a stator cavity substantially surrounding the stator end turns in order to help concentrate a liquid coolant within the stator cavity near the stator end turns; and
wherein the stator cavity is in fluid communication with the machine cavity; and
wherein the shroud protrudes into the machine cavity radially inward from the stator end turns; and
wherein the sleeve member includes a coolant jacket for circulating a liquid coolant around the electric machine and coolant apertures in fluid communication with the coolant jacket; and
wherein an exit of the coolant apertures is configured and arranged to direct the liquid coolant substantially toward a rotational axis of the rotor; and
wherein the coolant apertures are configured and arranged to disperse at least a portion of the liquid coolant substantially unpressurized from the coolant jacket into the machine cavity toward the stator end turns under gravity flow to at least partially wet the stator end turns with the liquid coolant.

11. The electric machine module of claim 10, wherein the shroud provides a generally arcuate path for the liquid coolant to flow substantially towards the machine cavity, and the shroud including a step with an angled rotor feed path, wherein the step is capable of receiving the liquid coolant following the generally arcuate path and the angled rotor feed path directs the liquid coolant back toward the electric machine.

12. The electric machine module of claim 11, wherein the electric machine includes a rotor and the angled rotor feed path directs the liquid coolant back toward the rotor substantially unpressurized and under gravity flow to at least partially wet the rotor.

13. The electric machine module of claim 10, wherein the at least one end cap includes two end caps positioned on either side of the electric machine.

14. A method for assembling an electric machine module comprising:
   providing the electric machine including a rotor and a stator circumscribing the rotor, the stator including stator end turns;
   enclosing the electric machine within a machine cavity of a housing, the housing including a sleeve member and at least one end cap with a shroud protruding into the machine cavity;
   disposing a plurality of coolant apertures through the sleeve member;
   wherein an exit of the coolant apertures is configured and arranged to direct a liquid coolant substantially toward a rotational axis of the rotor; and
   wherein the coolant apertures are configured and arranged to substantially guide the liquid coolant substantially unpressurized and under gravity flow towards the machine cavity;
   configuring the plurality of coolant apertures to disperse a liquid coolant toward the stator end turns;
   configuring the shroud to concentrate at least a first portion of the liquid coolant near the stator end turns; and
   providing a step in the shroud, the step being configured to redirect at least a second portion of the liquid coolant toward the rotor substantially unpressurized and under gravity flow to at least partially wet the rotor.

15. The method of claim 14, wherein the step includes an angled rotor feed path to redirect at least the second portion of the liquid coolant toward the rotor, and further comprising positioning the step along an arcuate path of the shroud before a coolant drop-off region.

* * * * *